May 21, 1929.　　　E. J. HILEMAN　　　1,714,367
GRATING MACHINE
Filed April 7, 1928　　　2 Sheets-Sheet 1
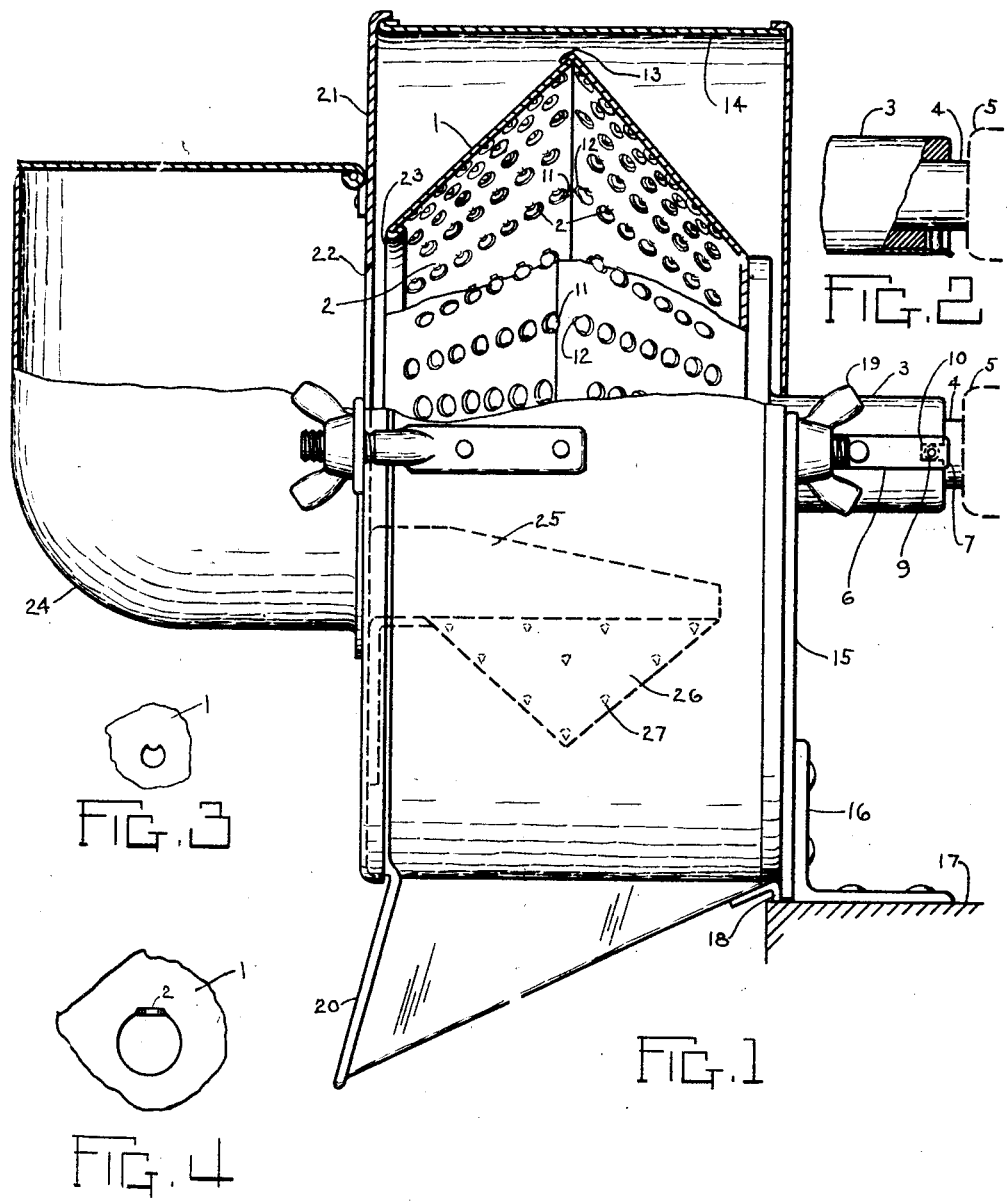
INVENTOR
Ernest J. Hileman
BY John A. Bommhardt
ATTORNEY

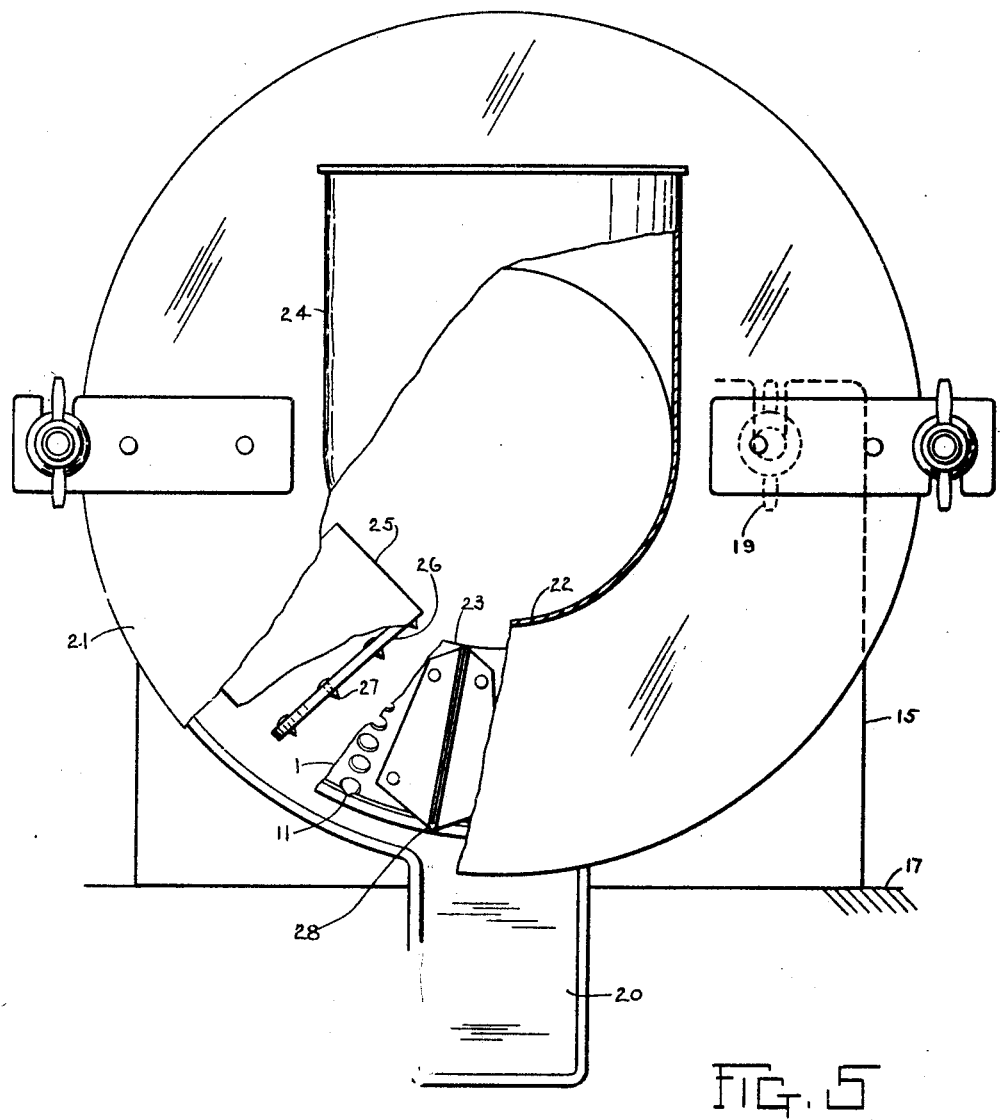

Patented May 21, 1929.

1,714,367

UNITED STATES PATENT OFFICE.

ERNEST J. HILEMAN, OF CLEVELAND, OHIO, ASSIGNOR OF ONE-HALF TO ALFRED D. VALLIQUETTE, OF DETROIT, MICHIGAN.

GRATING MACHINE.

Application filed April 7, 1928. Serial No. 268,151.

This invention relates to a machine for grating vegetables, fruits and the like.

It is the object of this invention to provide a simple, rapid, automatic machine which will efficiently grate potatoes, fruits and the like.

It has been the practice in graters and slicing machines to provide a cutting edge and adjacent thereto an opening through which the cut portion may escape as fast as it is cut off thereby producing slices or shreds and this has proved an objectionable feature.

With my machine I produce uniform small chunks and prevent shredding. Each cutting point is adapted to tear out its maximum chunk which is later dislodged and ejected by centrifugal force finding exit through conveniently located openings or holes.

In the drawings:

Figure 1 is a side view of my assembled machine; Fig. 2 is a sectional detail of a portion of Fig. 1; Fig. 3 shows one of the holes as punched; Fig. 4 shows the cutting tooth turned up at the side of the hole; Fig. 5 is a front view of Fig. 1.

Referring specifically to the drawings; a double conical drum 1 having interiorly projecting teeth 2 is provided at its closed end with a hub 3 adapted to be readily attached to or detached from the driving shaft 4 as for instance that of a motor 5. It has been found that a speed of 1700 R. P. M. is suitable. A spring 6 attached axially in a slot in the surface of said hub 3 has the end 7 bent up to cause it to ride up over the end of a pin 8 which is placed transversely in the motor shaft 4 and projects therefrom. When said hub 3 has been manually forced to working position the tip of said transverse pin 8 engages with a depression 9 on the inner side of said spring 6 and retains the hub 3 in correct position while driving power is transmitted due to the fact that said pin 8 has entered a driving slot 10 in the end of said hub 3.

The said interiorly projecting teeth 2 may conveniently be formed by first punching holes in the drum 1 of the shape shown in Fig. 3 and then causing the teeth to assume an upstanding position by passing a round drift through the holes forming projecting teeth as shown in Fig. 4. Additional cutting edges may be provided by upsetting the edges of the holes near the apex of the drum as shown at 11 and 12.

It will be noted that the wall of the drum is V-shaped (13) which causes the small chunk torn out by each individual tooth to be thrown by centrifugal force away from its tooth towards the point of the V and in so doing it escapes through the first hole it passes, out into the surrounding case 14. The said case 14 may be conveniently attached to a vertical plate 15 mounted as by an angle slip 16 to the stand 17 on which the motor 5 is mounted. A hook 18 entering the stand 17 and clamping means such as wing nuts 19 provide a way to quickly remove the case 14 for cleaning. A discharge spout 20 may conveniently be incorporated in the structure of the case 14, at the bottom thereof.

A removable cover plate 21 closes the end of the case 14 with the exception of a central opening 22 somewhat smaller than the opening 23 in the end of the revolving drum 1. A supply hopper 24 may be attached to said cover 21. A combined guide 25 and holding plate 26 is welded or otherwise attached to the inside of the cover 21 and extends into the grating drum 1 and down nearly to the inside of said drum. The guide plate 25 prevents the entering potatoes or the like from falling on the wrong side of the holding plate or abutment 26. Said holding plate 26 is an important part of the structure and it is important that it be adjusted or set so as to have an acute angle between the holding plate 26 and the approaching surface of the grating drum 1 and if this is not set properly the potatoes will bounce around instead of remaining in position. On the other hand if the angle is too acute there will be too much wedging action. The holding points 27 attached to the holding plate 26 assist materially in preventing unnecessary rolling of the potatoes.

As the ungrated portions grow smaller they fall into the tip of the beforementioned V, the last of the grating being accomplished by the extra teeth as heretofore explained.

Two pairs of scavenging blades 28 are attached to the outside of the grating drum 1 to prevent the accumulation of the grated material in the case 14 by carrying it to and delivering it into the discharge spout 20.

In operation, the potatoes or other articles feed from the hopper 24 and over the guide plate 25 to the side of the abutment plate 26 and as the drum revolves they are grated by the teeth or lips 2, 11 and 12 and the pieces escape through the holes in the drum and into the outer casing and are discharged therefrom through the spout 25.

I claim:

1. A grating machine comprising an outer casing, a double frustro-conical perforated drum rotatable therein, the drum having an open end, teeth projecting on the inside of the drum, a guide plate projecting through said opening, and an abutment plate projecting from said guide plate, inside the drum.

2. A grating machine comprising an outer casing, having an open end, a rotary grating drum in the casing, a removable cover plate on the open end of the drum, a hopper supported on the outside of said plate, and guide and abutment plates supported on the inside of the plate and extending into the drum.

3. A grating machine comprising an outer casing, and a rotary double frustro-conical perforated drum therein having interior teeth, means in the drum to prevent material being carried around therein, and a scavenging blade on the outside of the drum.

In testimony whereof, I do affix my signature.

ERNEST J. HILEMAN.